United States Patent
Nomura

(10) Patent No.: US 6,674,454 B2
(45) Date of Patent: Jan. 6, 2004

(54) COLOR IMAGE FORMING APPARATUS

(75) Inventor: Yujiro Nomura, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/309,822

(22) Filed: Dec. 5, 2002

(65) Prior Publication Data

US 2003/0107641 A1 Jun. 12, 2003

(30) Foreign Application Priority Data

Dec. 6, 2001 (JP) ..................................... P2001-372436
Dec. 6, 2001 (JP) ..................................... P2001-372437

(51) Int. Cl.[7] .............................................. G03G 15/01
(52) U.S. Cl. ........................ 347/115; 347/116; 347/232; 347/234
(58) Field of Search ................................ 347/115, 116, 347/232, 234, 118, 119

(56) References Cited

FOREIGN PATENT DOCUMENTS

| JP | 62-242471 A | 10/1987 |
|---|---|---|
| JP | 5-270051 A | 10/1993 |
| JP | 6-286226 A * | 10/1994 |
| JP | 7-97244 B2 | 10/1995 |
| JP | 2608080 B2 | 2/1997 |
| JP | 2000-347116 A | 12/2000 |

* cited by examiner

Primary Examiner—Joan Pendegrass
(74) Attorney, Agent, or Firm—Sughrue Mion, PLLC

(57) ABSTRACT

Image carriers are arranged so as to satisfy an expression; $-Ts/2 < t1+t2-t3-nTp < Ts/2$. "Ts" is a time period of scanning performed by each of scanning surfaces of a rotary polygon mirror. "Tp" is a time period of one rotation of the polygon mirror. "t1" is a time period required for a first image formed on a first image carrier among the image carriers is transferred to the transferred object at a first transferring position. "t2" is a time period required for the first image is traveled from the first transferring position to a second transferring position at which a second image formed on a second image carrier adjacent to the first image carrier at a downstream of the transporting path is transferred to the transferred object. "t3" is a time period required for the second image formed on the second image carrier is transferred to the transferred object at the second transferring position. "n" is a natural number.

6 Claims, 17 Drawing Sheets

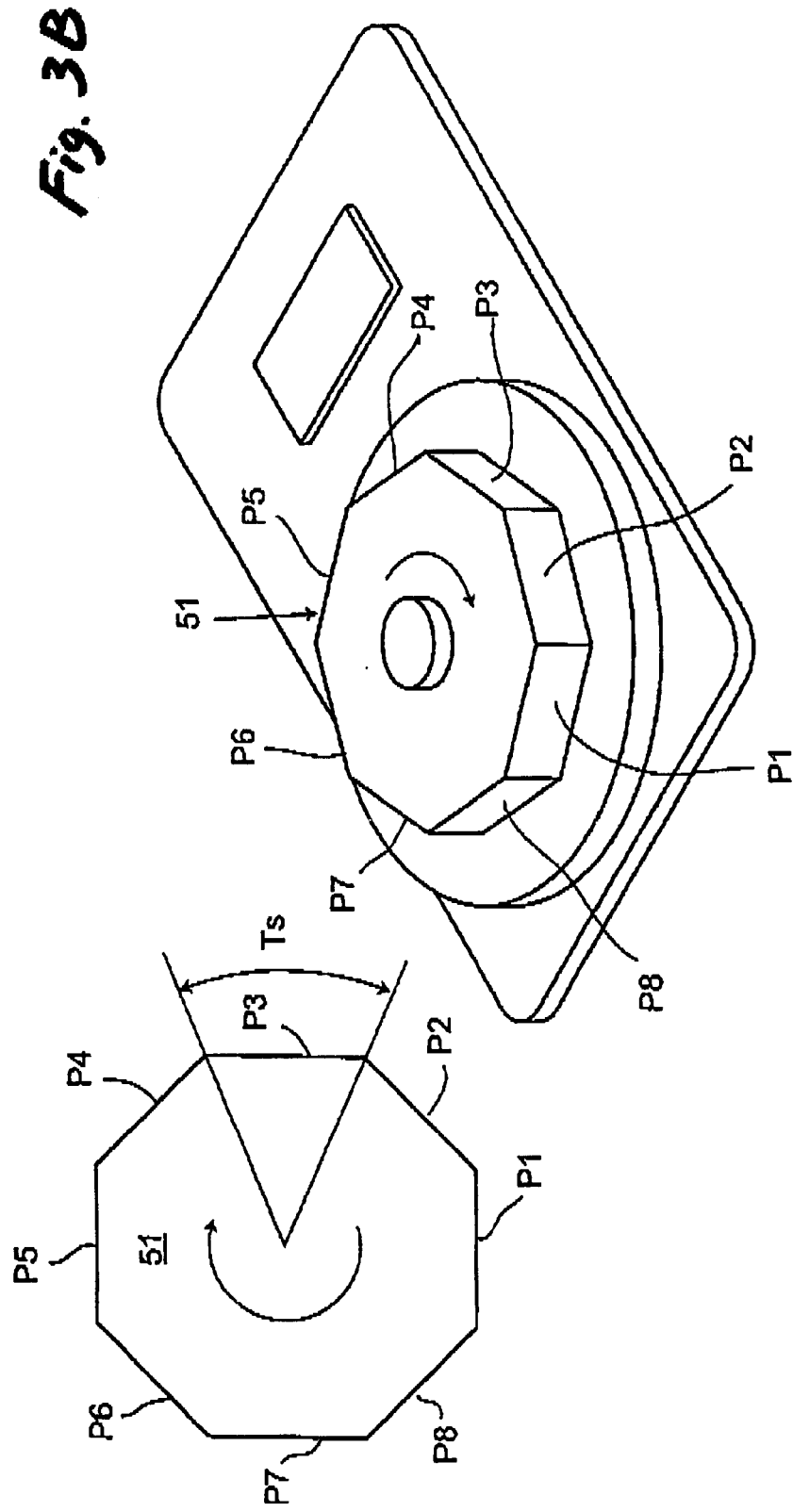

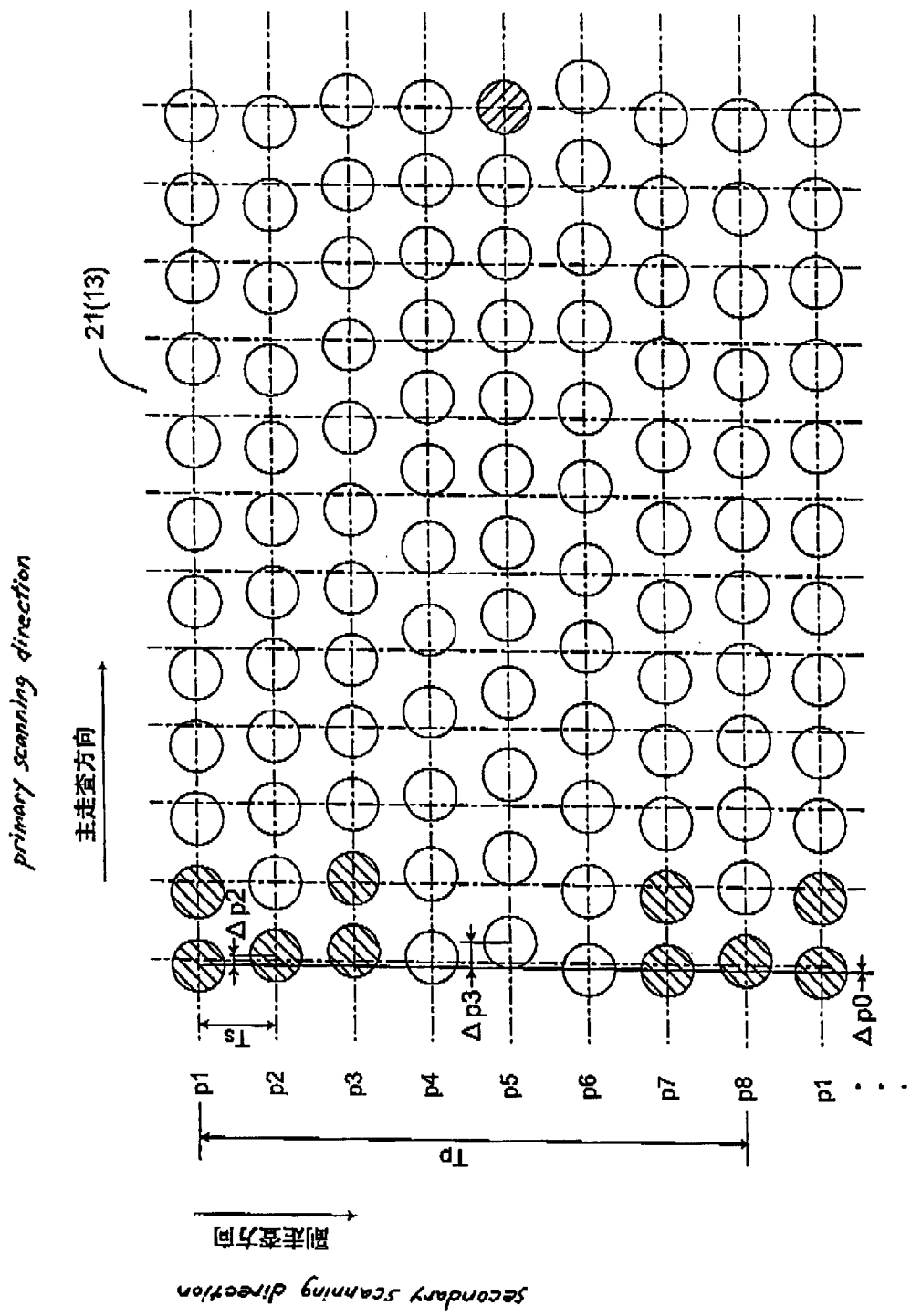

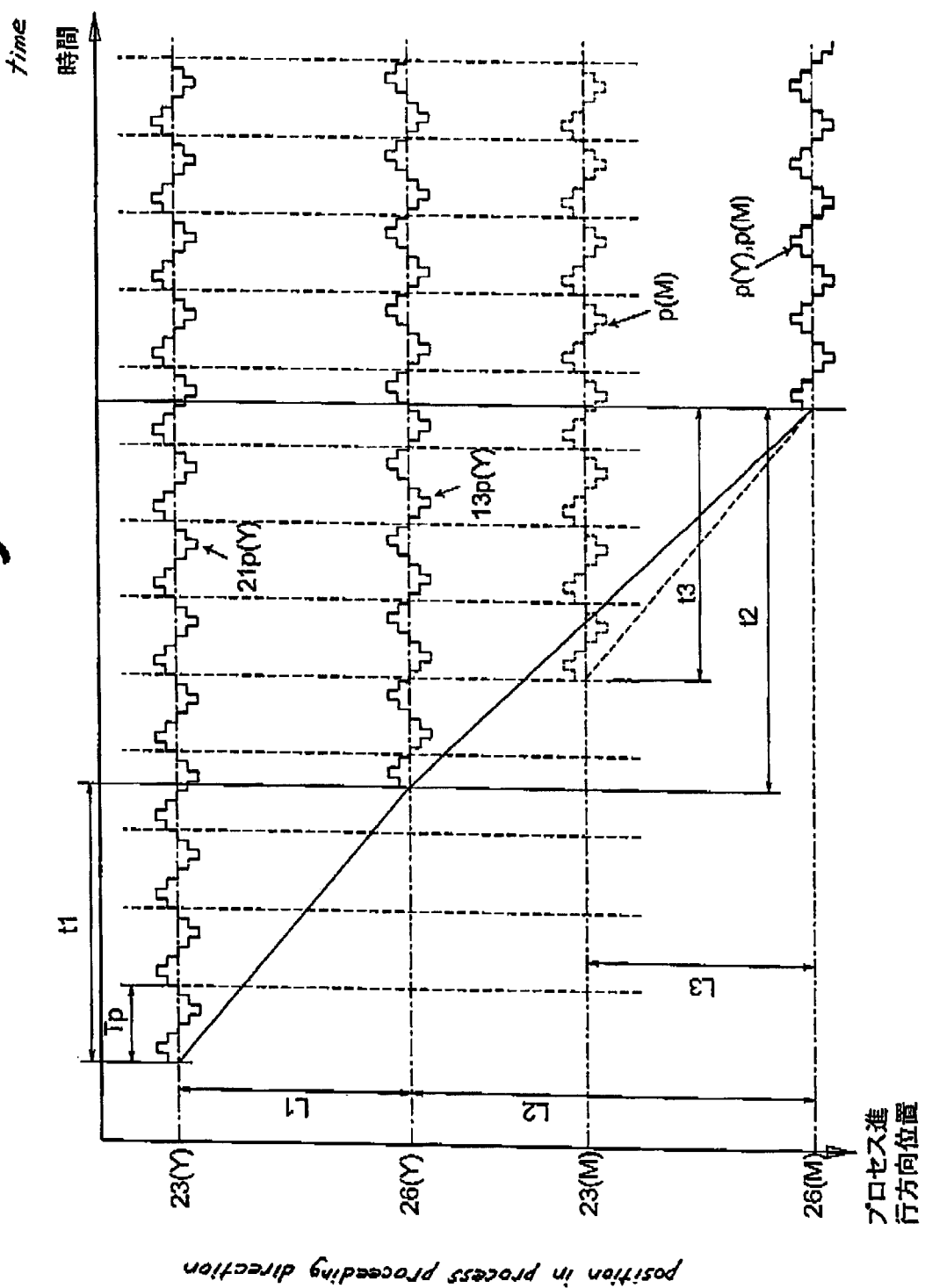

COLOR IMAGE FORMING APPARATUS

BACKGROUND OF THE INVENTION

The invention relates to a color image forming apparatus using the electrophotography technique. More specifically, the invention relates to a so-called tandem-type color image forming apparatus, wherein images are formed on respective image carriers with light scanned thereon in a primary scanning direction by a rotary polygon mirror while rotating them in a secondary scanning direction, and the formed images are superimposed one after another on an object of transfer to be moved in the secondary scanning direction. In particular, the invention relates to a countermeasure against a misregistration in colors of the images.

As described in, e.g., Japanese Patent Publication Nos. 5-270051A, 6-286226A, and 2000-347116A, a tandem-type color image forming apparatus of single rotary polygon mirror type has been known. A plurality of laser beams are deflected to perform a primary scanning by use of a single rotary polygon mirror, whereby the beams are separated from each other by a beam separation optical system constituted of a reflection mirror or the like. The thus-separated beams are guided to image carriers of corresponding colors, thereby forming images (latent images). As described in, e.g., Japanese Patent Publication Nos. 62-242471A and 7-97244B, there has also been known a tandem-type color image forming apparatus of multiple rotary polygon mirror type, wherein a laser scanning unit, comprising a laser light source, a rotary polygon mirror, and a scanning optical system, is provided for each image carrier. A rotary polygon mirror subjects a laser beam to deflection scanning (primary scanning) on a per-color basis, thereby forming an image on an image carrier of corresponding color.

In a color image forming apparatus of either of the above types, the images (latent images) formed on the respective image carriers are developed by a developer. The images are superimposed one after another on objects of transfer (intermediate transfer members or recording medium, such as paper) to be moved in a direction in which the image carriers are to be rotated (i.e., a secondary scanning direction). If the images formed on the respective image carriers are not correctly registered with each other, a misregistration arises in colors, thus deteriorating picture quality.

To solve the problem, as shown in FIG. 15, there has already been proposed a color image forming apparatus (as described in Japanese Patent No. 2608080), wherein a plurality of rotational image carriers 1(Y, M, C) are subjected to scanning in a primary scanning direction (an axial direction of the image carriers, that is, in the direction of a generating line), thereby forming images on the respective image carriers 1(Y, M, C). The images are sequentially superimposed on paper S to be moved in a secondary scanning direction in which the image carriers are to rotate, thereby forming a color image.

A scanning period of each scanning surface of a rotary polygon mirror 2 is taken as Ts (see FIG. 16). A time T1 is defined as the time lapsing while an image formed on the upstream image carrier 1(Y) from among the plurality of image carriers, for example, 1(Y) and 1(M) is moved from an image formation position 1a(Y) to a transfer position 1b(M) located between the downstream image carrier 1(M) and an object of transfer.

A time T2 is defined as the time lapsing while the image formed on the downstream image carrier 1(M) from among the plurality of image carriers is moved from an image forming position 1a(M) to a transfer position 1b(M) at which the image is to be transferred onto an object of transfer.

Under these conditions, the plurality of image carriers 1(Y, M, C) are arranged such that T1−T2≅nTs stands. The publication states that the range of "≅" is about ±20% of Ts. Here, "n" represents natural numbers.

In FIG. 15, L(Y), L(M), L(C) denote laser beams to be used for subjecting the image carriers 1(Y), 1(M), 1(C) to primary scanning. A belt 4 is an object of transfer to be used for transporting paper S in a secondary scanning direction.

The related-art apparatus yields the following advantage.

Namely, as shown in FIG. 16A, each of rotary polygon mirrors 2(Y), 2(M), 2(C) is assumed to be an octagonal prism which is rotated in the direction of the arrow and has scanning surfaces P1 through P8. The image carrier 1(Y) is sequentially subjected to primary scanning through use of the scanning surfaces P1 through P8 of the rotary polygon mirror 2(Y) (see FIG. 15), thereby forming images p1 to p8 on the image carrier 1(Y). The images p1 through p8 are transferred to the paper S. As shown in FIG. 16C, the image carrier 1(M) is also sequentially subjected to primary scanning through use of the scanning surfaces P1 through P8 of the rotary polygon mirror 2(M) (see FIG. 17), thereby forming images p1 through p8 on the image carrier 1(M). The images p1 through p8 on the paper S and the images p1 through p8 formed on the image carrier 1(M) are substantially in phase with each other at a transfer position 1b(M) at which images are to be transferred from the downstream image carrier 1(M) to an object of transfer. Hence, misregistration of colors is prevented. In this case, there is prevented occurrence of a great misregistration between the images p1 through p8 formed on the image carrier 1(Y) and the images p1 through p8 formed on the image carrier 1(M) with respect to the secondary scanning direction (i.e., the direction in which the object of transfer S is to be moved).

FIGS. 17A and 17B are views schematically showing writing of an image onto the image carrier 1 performed by the rotary polygon mirror 2.

As shown in FIG. 17A, the rotary polygon mirror 2, a shaft 2a of the mirror 2, and a support member 2b of the mirror 2 involve production errors. A rotation center O2 of the rotary polygon mirror 2 is inclined with respect to an ideal rotation center O1 (an angle of inclination is represented by θ).

For this reason, an image to be written (formed) on the image carrier 1 by the laser beam reflected from respective scanning surfaces of the rotary polygon mirror 2 will become deviated from an ideal writing position p0 (see FIG. 17B) with respect to the direction of movement of the image carrier 1 (i.e., the direction designated by an arrow; that is, the secondary scanning direction). Here, reference numeral 3 designates a scanning lens.

A maximum misregistration arises in the secondary scanning direction between images formed by mutually-opposing scanning surfaces (e.g., even-numbered surfaces which are 180° out of phase with each other). For instance, the rotary polygon mirror 2 is assumed to be an octagonal prism (see FIG. 16A) having scanning surfaces P1 through P8. As illustrated, maximum misregistration arises between an image p1 formed by a scanning light L (P1) reflected by the scanning surface P1 and an image p5 formed by a scanning light L (P5) reflected by the scanning surface P5. Similarly, maximum misregistration arises between images p2 and p6; between images p3 and p7; and between images p4 and p8.

Such a misregistration in the secondary scanning direction is also caused by inclination of the scanning surfaces with respect to the rotation center O2 of the rotary polygon mirror 2.

According to the related-art technique shown in FIG. 15, the plurality of image carriers 1(Y), 1(M), 1(C) are arranged such that T1−T2≅nTs stands. Hence, misregistration between colors becomes unlikely to arise. Specifically, as shown in FIGS. 16C and 16D, great misregistration becomes unlikely to arise in the secondary scanning direction between the images p1 through p8 formed on the image carrier 1(Y) and the images p1 through p8 formed on the image carrier 1(M). According to the related-art technique, the related-art apparatus is constructed so as to achieve the relationship T1−T2≅Ts. Hence, there may arise a problem of images formed on different scanning surfaces of the rotary polygon mirror 2 being superimposed on each other. Therefore, as shown in, e.g., FIGS. 16C and 16D, the image p1 formed by the scanning surface P1 of the rotary polygon mirror 2 may be superimposed on the image p5 formed by the scanning surface P5 of the same.

When such a problem has arisen, misregistration attributable to an inclination of the rotation center O2 of the rotary polygon mirror 2 may arise between images.

As is evident from the above descriptions, the related-art technique shown in FIG. 15 has a problem of difficulty in reducing misregistration between images that would be attributable to an inclination of the rotation center O2 of the rotary polygon mirror 2.

Such a problem arises in a similar manner even when a rotary polygon mirror is constituted of a single rotary polygon mirror.

SUMMARY OF THE INVENTION

It is therefore an object of a color image forming apparatus capable of lessening misregistration between images.

In order to achieve the above object, according to the invention, there is provided a color image forming apparatus, comprising
- a transporting path, through which a recording medium is transported;
- a plurality of rotary image carriers, arranged in the transporting path; wherein
  - at least one rotary polygon mirror, which rotates to reflect light so as to scan an outer peripheral surface of each of the image carriers in a first direction when each of the image carriers is rotated in a second direction perpendicular to the first direction, so that a monochrome latent image is formed on the outer peripheral surface of each of the image carriers to be developed and superimposedly transferred onto a transferred object to form a color image thereon,
  - wherein the image carriers are arranged so as to satisfy the following expression:

$$-Ts/2 < t1 + t2 - t3 - nTp < Ts/2$$

where Ts is a time period of scanning performed by each of reflecting surfaces of the polygon mirror;
Tp is a time period of one rotation of the polygon mirror;
t1 is a time period required for a first latent image formed on a first image carrier among the image carriers is developed and transferred to the transferred object at a first transferring position;
t2 is a time period required for the first image is traveled from the first transferring position to a second transferring position at a downstream of the transporting path;
t3 is a time period required for a second latent image formed on a second image carrier adjacent to the first image carrier is developed and transferred to the transferred object at the second transferring position; and
n is a natural number.

In such a configuration, the image formed by a certain scanning surface of the rotary polygon mirror and the image formed on the downstream image carrier by the same scanning surface of the rotary polygon mirror are inevitably overlapped on one another. A misregistration developing between images due to warpage of the scanning surfaces is cancelled. Therefore, a misregistration between images is diminished further According to the invention, there is also provided a color image forming apparatus, comprising:
- a transporting path, through which a recording medium is transported;
- a plurality of rotary image carriers, arranged in the transporting path; wherein
  - at least one rotary polygon mirror, which rotates to reflect light so as to scan an outer peripheral surface of each of the image carriers in a first direction when each of the image carriers is rotated in a second direction perpendicular to the first direction, so that a monochrome latent image is formed on the outer peripheral surface of each of the image carriers to be developed and superimposedly transferred onto a transferred object to form a color image thereon,
  - wherein the image carriers are arranged so as to satisfy the following expression:

$$|t1+t2-t3-nTp| < [(Np/2)-0.5]Tp/Np$$

where Np is the number of reflecting surfaces of the polygon mirror which is an even number not less than 4;
Ts is a time period of scanning performed by each of the reflecting surfaces of the polygon mirror;
Tp is a time period of one rotation of the polygon mirror;
t1 is a time period required for a first latent image formed on a first image carrier among the image carriers is developed and transferred to the transferred object at a first transferring position;
t2 is a time period required for the first image is traveled from the first transferring position to a second transferring position at a downstream of the transporting path;
t3 is a time period required for a second latent image formed on a second image carrier adjacent to the first image carrier is developed and transferred to the transferred object at the second transferring position; and
n is a natural number.

Alternatively, there is also provided a color image forming apparatus, comprising;
- a transporting path, through which a recording medium is transported;
- a plurality of rotary image carriers, arranged in the transporting path; wherein
  - at least one rotary polygon mirror, which rotates to reflect light-so as to scan an outer peripheral surface of each of the image carriers in a first direction when each of the image carriers is rotated in a second direction perpendicular to the first direction, so that a monochrome latent image is formed on the outer peripheral surface of each of the image carriers to be developed and superimposedly transferred onto a transferred object to form a color image thereon, wherein the image carriers are arranged so as to satisfy the following expression:

$$|t1+t2-t3-nTp|<[(Np/2)-0.5]Tp/Np$$

where Np is the number of reflecting surfaces of the polygon mirror which is an odd number not less than 3;

Ts is a time period of reflecting performed by each of the scanning surfaces of the polygon mirror;

Tp is a time period of one rotation of the polygon mirror;

t1 is a time period required for a first latent image formed on a first image carrier among the image carriers is developed and transferred to the transferred object at a first transferring position;

t2 is a time period required for the first image is traveled from the first transferring position to a second transferring position at a downstream of the transporting path;

t3 is a time period required for a second latent image formed on a second image carrier adjacent to the first image carrier is developed and transferred to the transferred object at the second transferring position; and n is a natural number.

In such configurations, occurrence of the following situation is at least prevented. Specifically, an image formed on an upstream image carrier by a certain scanning surface of the rotary polygon mirror and an image formed on a downstream image carrier by an opposing scanning surface of the rotary polygon mirror are superimposed on each other.

Therefore, there is prevented occurrence of maximum misregistration between images, which would otherwise be attributed to an inclination of the rotation center of the rotary polygon mirror. Consequently, a misregistration arising between images is diminished.

In the above configurations, a plurality of polygon mirrors may be provided so as to be associated with the image carriers in a one-by-one manner.

In the above configurations, the transferred object may be an intermediate transfer belt which temporarily retains the color image to be transferred to the recording medium.

Alternatively, the transferred object may be the recording medium.

BRIEF DESCRIPTION OF THE DRAWINGS

The above objects and advantages of the present invention will become more apparent by describing in detail preferred exemplary embodiments thereof with reference to the accompanying drawings, wherein;

FIG. 3A is a front view of a rotary polygon mirror;

FIG. 3B is a perspective view of the rotary polygon mirror;

FIG. 6 is a diagram for describing the operation of the color image forming apparatus according to the first embodiment;

FIGS. 7 and 8 are diagrams for explaining the operation of a color image forming apparatus according to a second embodiment of the invention;

DETAILED DESCRIPTION OF THE PREFERRED EMBODIMENTS

Embodiments of the invention will now be described hereinbelow by reference to the accompanying drawings.

Figure 1:
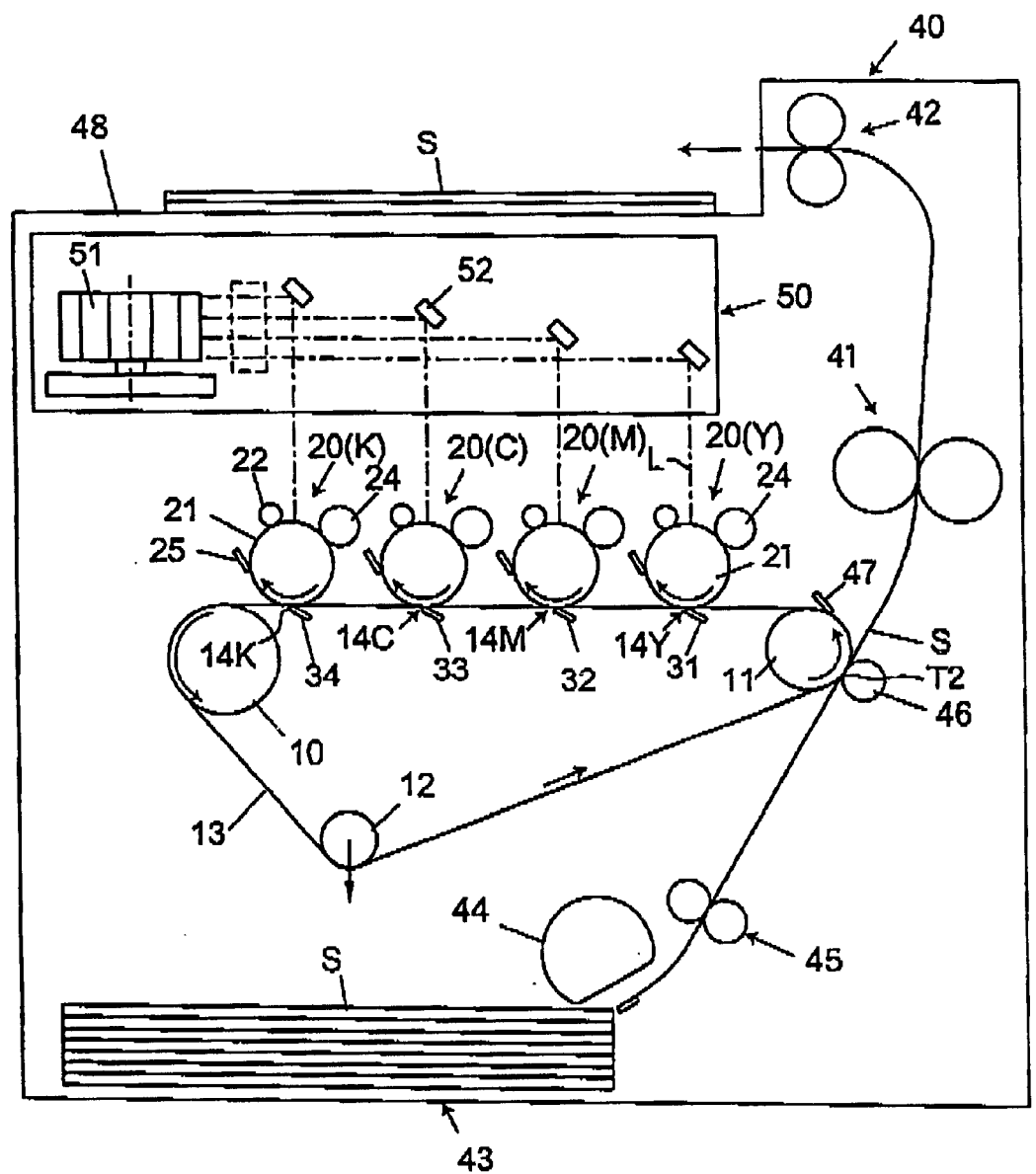
FIG. 1 is a schematic front view showing a color image forming apparatus according to a first embodiment of the invention.

As shown in FIG. 1, a color image forming apparatus according to a first embodiment comprises an intermediate transfer belt 13, and a plurality of monochrome toner image formers 20(Y), 20(M), 20(C), 20(K) disposed with respect to the intermediate transfer belt 13. Here, the intermediate transfer belt 13 is passed around a drive roller 10, a follower roller 11, and a tension roller 12 and is circulated and driven in the direction of the arrow (i.e., a counterclockwise direction). A plurality of monochrome toner images formed by the monochrome toner image formers 20 are sequentially transferred onto the intermediate transfer belt 13 by transfer members 31, 32, 33, and 34 (transfer blades are employed in the illustration). Further, transfer positions of the respective toner image formers 20(Y), 20(M), 20(C), and 20(K) are denoted by 14Y, 14M, 14C, and 14K, respectively.

Each of the yellow toner image former 20(Y), the magenta toner image former 20(M), the cyan toner image former 20(C), and the black toner image former 20(K) has a photosensitive member 21 provided with a photosensitive layer placed on its outer peripheral surface; an electrostatically-charging roller 22 serving as a charger for uniformly charging the outer peripheral surface of the photosensitive member 21; an exposer (an image writer) 50 for forming an electrostatic latent image by selectively exposing, to exposure light L, the outer peripheral surface that has been uniformly electrostatically charged by the electrostatically-charging roller 22; a developing roller 24 serving as a developer which makes the latent image formed by the exposure means 50 a visible image (toner image) by imparting to the latent image toner serving as a developing agent; and a cleaning blade 25 which clears the toner still remaining on the surface of the photosensitive member 21 after the toner image developed by the developing roller 24 has been transferred onto the intermediate transfer belt 13 serving as an intermediate transfer member (i.e., a primary object of transfer).

The toner image, which is a full color image formed as a result of toner images being sequentially transferred and superimposed on the intermediate transfer belt 13 through a primary transfer operation, is transferred onto a recording medium S such as paper by a secondary transfer section T2 through a secondary transfer operation (i.e., a collective transfer operation). The recording medium S passes through a pair of fixing rollers 41 which serve as a fixing section, whereby the toner image is fixed on the recording medium S. The recording medium S is then discharged to a discharging tray 48 formed on top of a case of a main unit 40.

A plurality of recording mediums S are stacked and held in a paper feed cassette 43. A pickup roller 44 feeds the recording medium S one sheet at a time from the paper feed cassette 43. A pair of gate rollers 45 defines a timing at which the recording medium S is to be fed to the secondary transfer section T2. A secondary transfer roller 46 serves as a secondary transfer member which constitutes the secondary transfer section T2 with respect to the intermediate transfer belt 13. A cleaning blade 47 serves as a cleaner which cleans the toner remaining on the surface of the intermediate transfer belt 13 after the secondary transfer operation.

The secondary transfer section T2 where a color toner image is transferred from the intermediate transfer belt 13 to the recording medium S is constituted at a position where the intermediate transfer belt 13 is passed around the follower roller 11. The recording medium S passes upward through the secondary transfer section T2 from below.

The cleaning blade 47 which cleans the toner still remaining on the intermediate transfer belt 13 after secondary transfer operation remains in contact with the intermediate transfer belt 13 at a position where the intermediate transfer belt 13 is passed around the follower roller 11.

Figure 2:
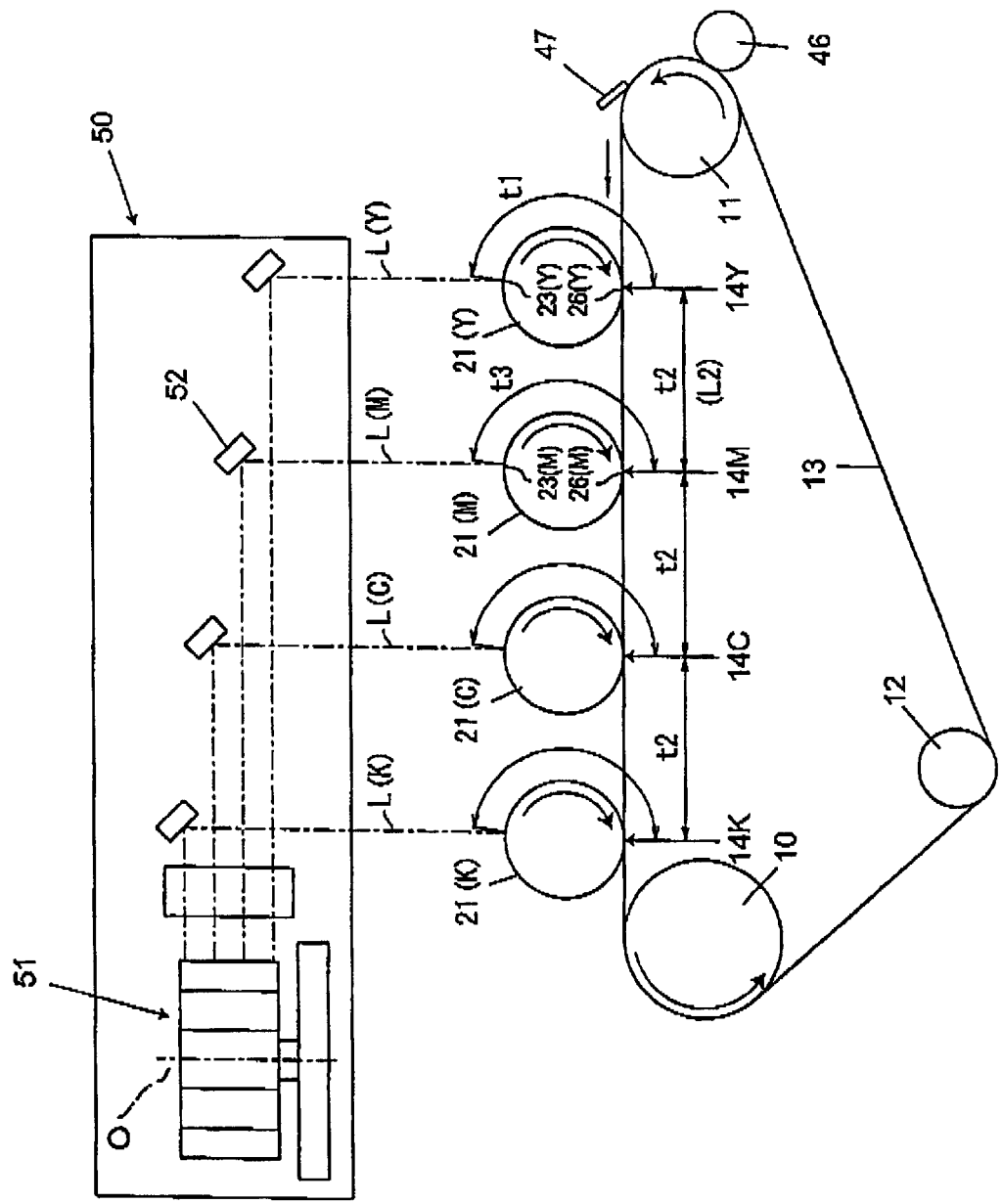
FIG. 2 is a fragmentary enlarged view of FIG. 1.

As shown in FIGS. 1 and 2, the exposer 50 subjects the plurality of rotational image carriers 21(Y), 21(M), 21(C), and 21(K) to primary scanning by use of a single rotary polygon mirror 51, thereby forming images on the respective image carriers 21(Y), 21(M), 21(C), and 21(K). The thus-formed images are sequentially superimposed on the intermediate transfer belt 13, which moves in a secondary scanning direction in which the image carriers rotate and is an object of transfer, thus forming a color image.

The exposer 50 is of single rotary polygon mirror type. Namely, the exposer 50 causes a plurality of laser beams L(Y), L(M), L(C), and L(K) to effect the primary scanning through use of the single rotary polygon mirror 51. The laser beams are separated from each other by a beam separation optical system constituted of a return mirror 52 or the like. The thus-separated laser beams are guided to the corresponding image carriers 21(Y), 21(M), 21(C), 21(K), thereby forming images (latent images).

As illustrated in FIGS. 3A and 3B, the rotary polygon mirror 51 is an octagonal prism which rotates in the direction of the arrow and has scanning surfaces P1 through P8.

In the embodiment, as shown in FIGS. 2 and 3A, the plurality of image carriers 21(Y), 21(M), 21(C) and 21(K) are arranged so as to satisfy the conditions represented by $$-Ts/2 < t1+t2-t3-nTp < Ts/2$$

Here, Ts (see FIG. 3A) is the period of scanning performed by each of scanning surfaces P1 through P8 of the rotary polygon mirror 51;

Tp is the period of one rotation of the rotary polygon mirror 51 (where Tp=8Ts);

t1 is a time required for an image formed on the upstream image carrier 21(Y) among the plurality of image carriers (the image carriers 21(Y), 21(M) are described as typical image carriers) to be transferred from the image formation position 23(Y) to the transfer position 26(Y), where the image is transferred to the intermediate transfer belt 13;

t2 is a time required for the image to travel from the upstream transfer position 26(Y) to a downstream transfer position 26(M) defined between the downstream image carrier 21(M) and the intermediate transfer belt 13;

t3 is a time required for the image formed on the downstream image carrier 21(M) among the image carriers 21(Y), 21(M) to travel from the image formation position 23(M) to the transfer position 26(M); and n is a natural number.

An interval between the image carriers 21Y and 21M, an interval between the image carriers 21Y and 21C, an interval between the image carriers 21Y and 21K an interval between the image carriers 21M and 21C, an interval between the image carriers 21M and 21K and an interval between the image carriers 21C and 21K are defined such that the foregoing expression stands. In other words, the parameters of the image formers (i.e., the period of rotation of the rotary polygon mirror 61, the diameter and rotational speed of the image carrier 21(Y), those of the image carrier 21(M), those of the image carrier 21(C), those of the image carrier 21(K), and the traveling speed of the object of transfer 13) are determined such that the foregoing expression stands among all the image carriers.

The color image forming apparatus yields the following advantage.

In the image forming apparatus using a plurality of image carriers, after formation of an image on an upstream image carrier has been started, formation of an image on a downstream image carrier is started upon lapse of a predetermined time period (t1), thus attempting to register the images formed on the respective image carriers with each other on an object of transfer. In an apparatus in which a plurality of rotational image carriers are subjected to primary scanning by the rotary polygon mirror, whereby images are formed (written) on the respective image carriers, images are written in synchronism with a scanning period Ts of the rotary polygon mirror.

Hence, the predetermined time "ti" assumes only the value of an interval between the scanning periods Ts (i.e., a pitch Ts). The accuracy of positioning of an image in the secondary scanning direction can be set to Ts/2 or less when converted to time, by making the predetermined time "ti" close to the value (ti+t2−t3). In other words, the following conditions are satisfied:

$$-Ts/2 < t1+t2-t3-nTp < Ts/2$$

Here, in the embodiment, the predetermined time "ti" is set so as to assume a natural multiple of the rotation period Tp of the rotary polygon mirror 51; that is, the foregoing expression (−Ts/2 <t1+t2−t3−nTp<Ts/2) stands.

The advantage will be described in more detail by taking the image carriers 21(Y) and 21(M) as typical members and by reference to FIGS. 4A through 5B.

Figure 4A:
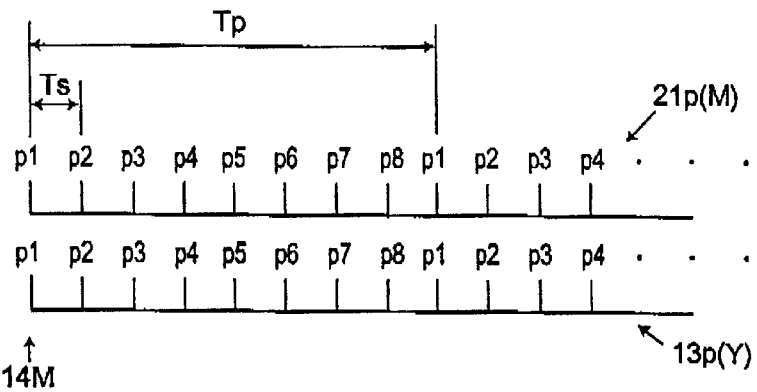
FIGS. 4A through 4C are diagrams for describing the operation of the color image forming apparatus.
Figure 4B:
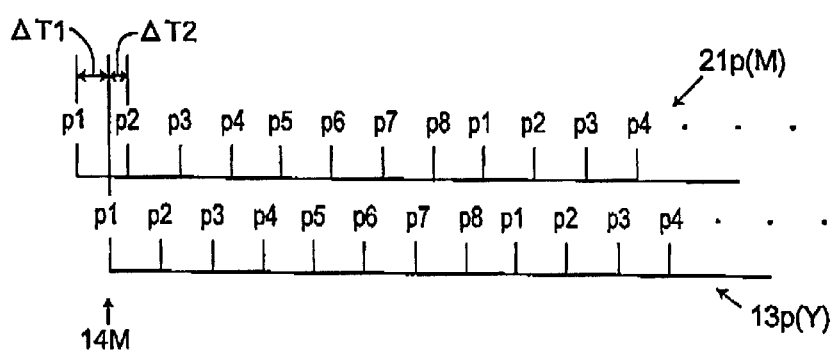
Figure 4C:
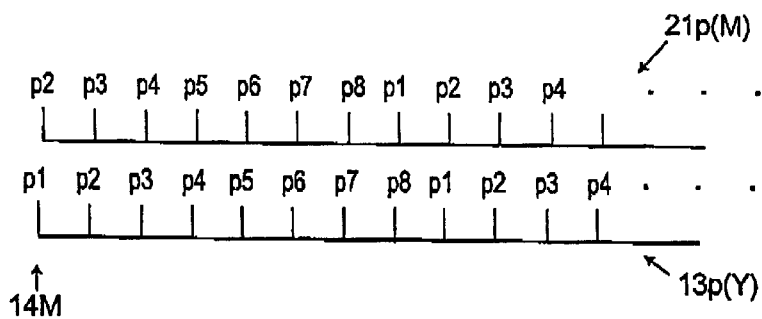

FIGS. 4A through 4C show that an image 13p(Y) (hereinafter called simply a "Y image") which is formed on the image carrier 21(Y) by the scanning surfaces P1 through P8 of the rotary polygon mirror 51 and an image 21p(M) (hereinafter called simply an "M image") which is formed on the image carrier 21(M) by the scanning surfaces P1 through P8 of the rotary polygon mirror 51 overlap each other at the transfer position 14M located between the downstream image carrier 21(M) and the object of transfer 13. In the drawings, p1 through p8 designate positions of the images formed by the scanning surfaces P1 through P8 in the secondary scanning direction (where the images are also omitted).

As shown in FIG. 4A, an image in which an essentially complete match exists between the Y image 13p(Y) and the M image 21p(M) is desirably formed by identical scanning surfaces of the rotary polygon mirror 51 (e.g., images p1, p1 at the leading ends in FIG. 4A are formed by a scanning surface P1), and the images p1, p1 are desirably superimposed on one another while perfectly coinciding with each other.

However, if no countermeasures are taken for a configuration; that is, countermeasures in relation to the distance L2 (see FIG. 2) from the upstream transfer position 26(Y) to the downstream transfer position 26(M) and the traveling speed of an object of transfer (here, the intermediate transfer belt 13), images to be superimposed on each other fail to be formed by identical scanning surfaces. Further, the images become drastically out of phase with each other.

Figure 16A:
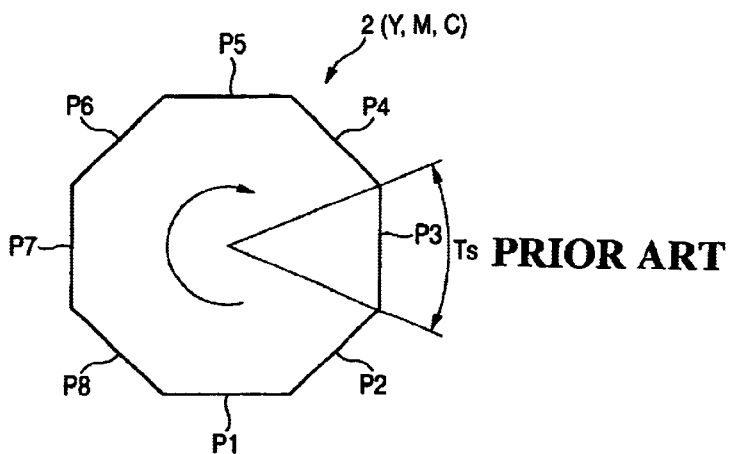
FIGS. 16A through 16D are descriptive views of the related art color image forming apparatus.
Figure 16B:
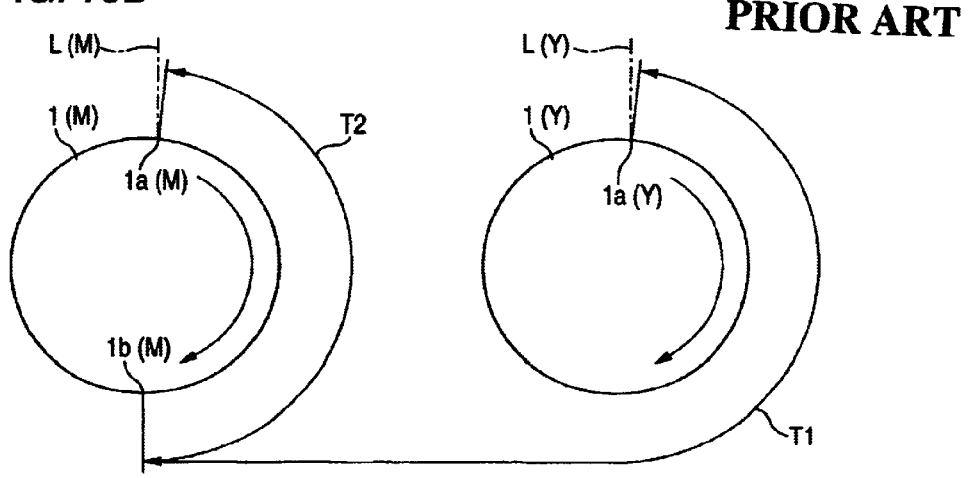
Figure 16C:
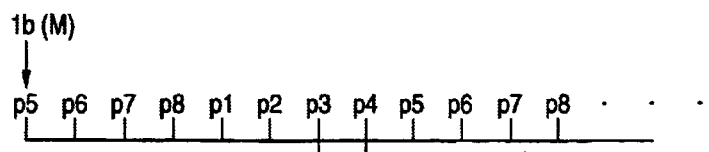
Figure 16D:
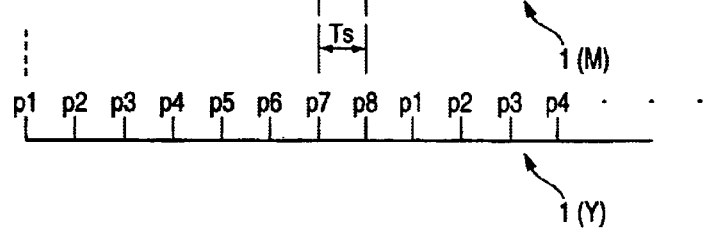

Under such circumstances, as mentioned above, if the predetermined time "t1" is set such that $(-Ts/2 < t1+t2-t3-ti < Ts/2)$ stands, as shown in FIG. 4B it is seen that a phase difference $\Delta T2$ existing between an image p1 of the Y image 13p(Y) and an image p2 of the M image 21p(M) can become shorter than a phase difference $\Delta T1$ existing between the image p1 of the Y image 13p(Y) and an image p1 of the M image 21p(M). Consequently, as shown in FIG. 4C, there may arise a phenomenon of the M image formed by the scanning surface P2 overlapping the Y image formed by the scanning surface P1. In some cases, as shown in FIGS. 16C and 16D, an overlap arises between the image p1 formed by the scanning surface P1 of the rotary polygon mirror and the image p5 formed by the opposite surface P5 of the same.

Figure 5A:
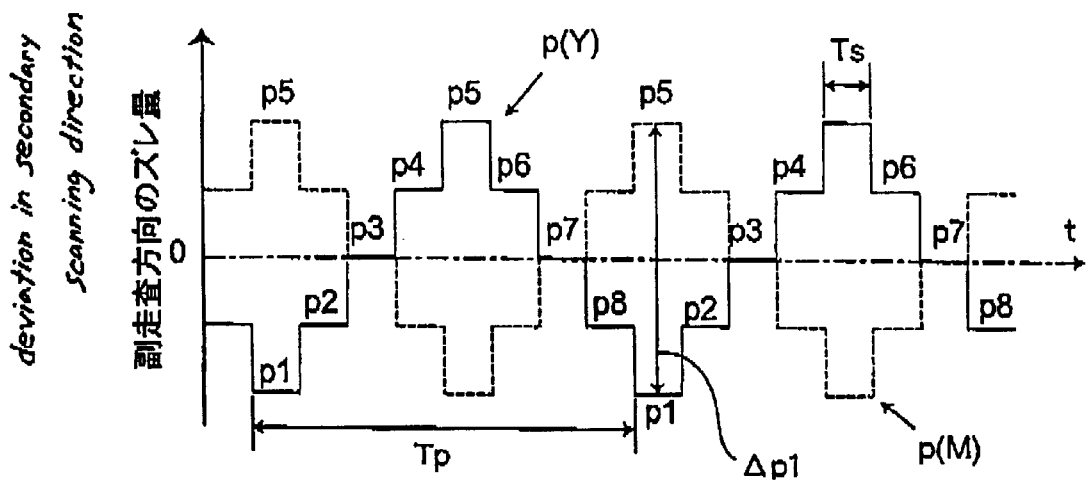
FIGS. 5A and 5B are diagrams for explaining the operation of the color image forming apparatus according to the first embodiment.

If such a problem has arisen, the Y mage p(Y) and the M image p(M) become greatly shifted from each other, as shown in FIG. 5A, because the scanning surfaces P1 and P5 of the rotary polygon mirror are 180° out of phase from each other. In other words, the maximum amount of misregistration arises in $\Delta p1$.

Figure 5B:
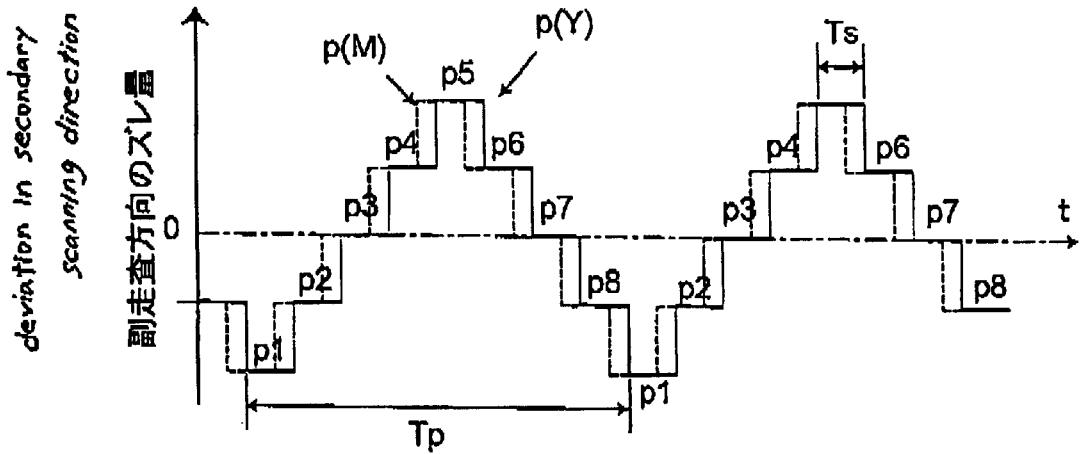
Figure 17A:
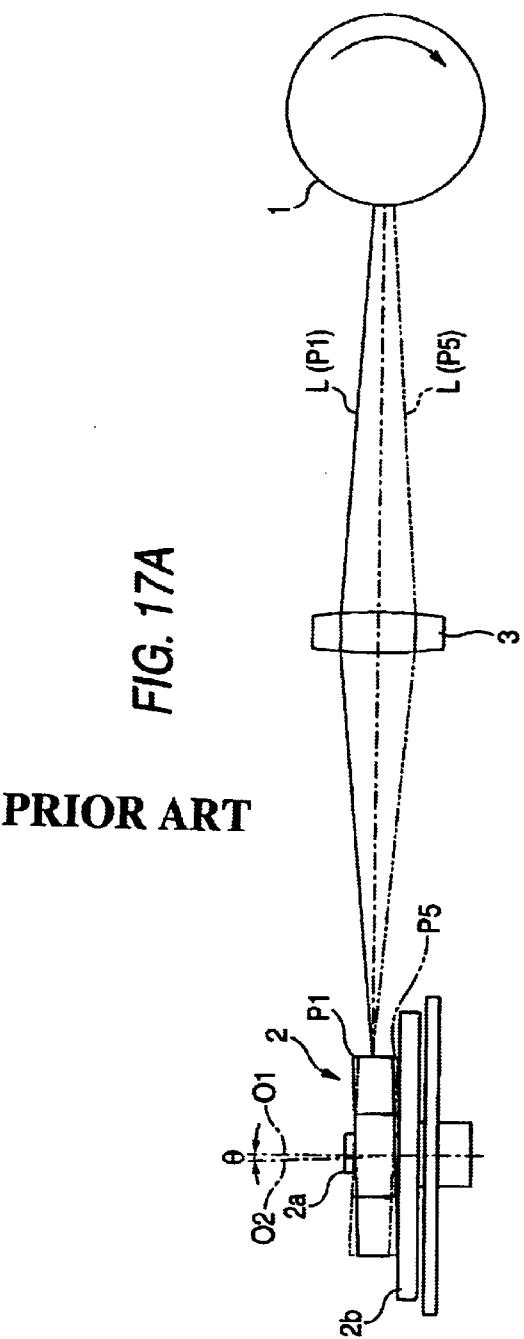
FIGS. 17A and 17B are descriptive views of a problem arising in the related art color image forming apparatus.
Figure 17B:
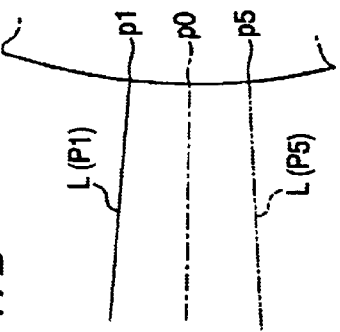

Both FIGS. 5A and 5B show that the Y image p(Y) and the M image p(M) overlap one another. The amount of misregistration arising in the secondary scanning direction (see FIG. 17B) is taken as a vertical axis, and time "t" is taken as a horizontal axis.

According to the embodiment, the plurality of image carriers are arranged such that the foregoing expression $(-Ts/2 < t1+t2-t3-nTp < Ts/2)$ stands. For this reason, occurrence of a problem such as that described by reference to FIGS. 4B and 4C is prevented. The image p1 formed by a certain surface (e.g., the surface P1) of the rotary polygon mirror 51 and the image p1 formed on the downstream image carrier 21(M) by the same surface (i.e., the surface P1 in this embodiment) of the rotary polygon mirror 51 are inevitably overlapped on one another.

Consequently, as shown in FIG. 5B, a misregistration developing between images for reasons of an inclination of the rotation center O of the rotary polygon mirror 51 is cancelled. Therefore, a misregistration between images is diminished.

FIG. 6 is a view schematically showing rows of pixels which have been formed on the image carrier 21 or transferred onto the object of transfer 13. In the drawing, p1 through p8 designate images (rows of pixels) formed by the scanning surfaces P1 through P8 of the rotary polygon mirror 51.

The respective scanning surfaces P1 through P8 of the rotary polygon mirror 51 are not perfectly planar and involve slight warpage caused by production errors. As shown in FIG. 6, positional misregistration $\Delta p2$ or $\Delta p3$ arises in the row of pixels p1 through p8 formed by the scanning surfaces P1 through P8 with respect to the direction of primary scanning.

However, according to the color image forming apparatus of the embodiment, the image (e.g., the row of pixels p1 in the above-described embodiment) formed by a certain surface (e.g., the surface P1) of the rotary polygon mirror 51 and the image (i.e., the row of pixels p1) formed on the downstream image carrier by the same surface (i.e., the surface P1) of the rotary polygon mirror 51 are inevitably overlapped on one another.

Next, a second embodiment of the invention will be described. In this embodiment, the plurality of image carriers 21(Y), 21(M), 21(C), and 21(K) are arranged so as to satisfy the following condition:

$$|t1+t2-t3-nTp| < [(Np/2)-0.5]Tp/Np$$

Here, Np is the number of surfaces of the rotary polygon mirror 51 (where Np=8);

Ts (see FIG. 3A) is the period of scanning performed by each of scanning surfaces P1 through P8 of the rotary polygon mirror 51;

Tp is the period of one rotation of the rotary polygon mirror 51 (where Tp=8Ts);

t1 is a time required for an image formed on the upstream image carrier 21(Y) among the plurality of image carriers (the image carriers 21(Y), 21(M) are described as typical image carriers) to be transferred from the image formation position 23(Y) to the transfer position 26(Y), where the image is transferred to the intermediate transfer belt 13;

t2 is a time required for the image to travel from the upstream transfer position 26(Y) to a downstream transfer position 26(M) defined between the downstream image carrier 21(M) and the intermediate transfer belt 13;

t3 is a time required for the image formed on the downstream image carrier 21(M) among the image carriers 21(Y), 21(M) to travel from the image formation position 23(M) to the transfer position 26(M); and n is a natural number.

An interval between the image carriers 21Y and 21M, an interval between the image carriers 21Y and 21C, an interval between the image carriers 21Y and 21K, an interval between the image carriers 21M and 21C, an interval between the image carriers 21M and 21K, and an interval between the image carriers 21C and 21K are defined such that the foregoing expression stands. In other words, the parameters of the image formers (i.e., the period of rotation of the rotary polygon mirror 51, the diameter and rotational speed of the image carrier 21(Y), those of the image carrier 21(M), those of the image carrier 21(C), those of the image carrier 21(K), and the traveling speed of the object of transfer 13) are determined such that the foregoing expression stands among all the image carriers.

In the embodiment, Np=8. Hence, provided that (t1+t2-t3-nTp) is taken as $\Delta Tp$, the above-described expression assumes $|\Delta Tp| < (3.5/8)$ Tp.

The color image forming apparatus yields the following advantage.

In the image forming apparatus using a plurality of image carriers, after formation of an image on an upstream image carrier has been started, formation of an image on a downstream image carrier is started after lapse of a predetermined period of time (ti), thus attempting to register the images formed on the respective image carriers with each other on an object of transfer. In an apparatus in which a plurality of rotational image carriers are subjected to primary scanning by the rotary polygon mirror, whereby images are formed (written) on the respective image carriers, images are written in synchronism with a scanning period Ts of the rotary polygon mirror. Hence, the predetermined time "ti" assumes only the value of an interval between the scanning periods Ts (i.e., a pitch Ts). The accuracy of positioning of an image in a secondary scanning direction can be further enhanced by making the predetermined time "ti" close to the value (t1+t2−t3).

In the embodiment, the plurality of image carriers are arranged such that the predetermined time "ti" is made close to a natural multiple of the rotation period of the rotary polygon mirror and so as to further satisfy the above expression: $|t1+t2-t3-nTp|<[(Np/2)-0.5]$ Tp/Np. Hence, occurrence of the following situation is prevented. Specifically, an image formed on an upstream image carrier by a certain surface (e.g., the surface P1) of the rotary polygon mirror and an image formed on a downstream image carrier by an opposing surface (e.g., a surface P5 when the rotary polygon mirror has eight surfaces) opposite the surface (e.g., the surface P1) of the rotary polygon mirror are superimposed on each other.

Therefore, occurrence of maximum misregistration between images which would otherwise be attributed to an indication of the rotation center O of the rotary polygon mirror is prevented. Consequently, a misregistration arising between images is diminished.

The advantage will be described in more detail by taking the image carriers 21(Y) and 21(M) as typical members and by reference to FIGS. 4A through 4C and FIGS. 7 through 10B.

As shown in FIGS. 4A and 7, an essentially complete match desirably exists between the Y image 13$p$(Y) and the M image 21$p$(M) at the transfer position 14M. In FIG. 7, a position located in the direction in which processing pertaining to image formation processes proceeds is taken as a vertical axis, and time is taken as a horizontal axis. In the drawings, L1 designates a circumferential length of the image carrier 21 (Y) from the image writing position 23(Y) (see FIG. 2) to the transfer position 26(Y); L2 designates a distance between the transfer position 26(Y) of a Y image to the transfer position 26(M) of the M image; and L3 designates a circumferential length of the image carrier 21(M) from the image writing position 23(M) to the transfer position 26(M).

However, if no countermeasures are taken for a configuration; that is, countermeasures in relation to the distance 12 (see FIG. 2) from the upstream transfer position 26(Y) to the downstream transfer position 26(M) and the traveling speed of an object of transfer (here, the intermediate transfer belt 13), images to be superimposed on each other fail to be formed by an identical scanning surface. Further, the images become drastically out of phase with each other.

Under such circumstances, as mentioned above, if settings are effected such that the predetermined time "ti" is made closer to the value (t1+t2−t3), as shown in FIG. 4B it is seen that a phase difference ΔT2 existing between an image p1 of the Y image 13$p$(Y) and an image p2 of the M image 21$p$(M) can become shorter than a phase difference ΔT1 existing between the image p1 of the Y image 13$p$(Y) and an image p1 of the M image 21$p$(M). Consequently, as shown in FIG. 4C, there may arise a phenomenon of the M image formed by the scanning surface P2 overlapping the Y image formed by the scanning surface P1. In some cases, as shown in FIGS. 16C and 16D, an overlap arises between the image p1 formed by the scanning surface P1 of the rotary polygon mirror and the image p5 formed by the opposite surface P5, which surface is 180° out of phase from the scanning surface P1 of the rotary polygon mirror.

Figure 8:
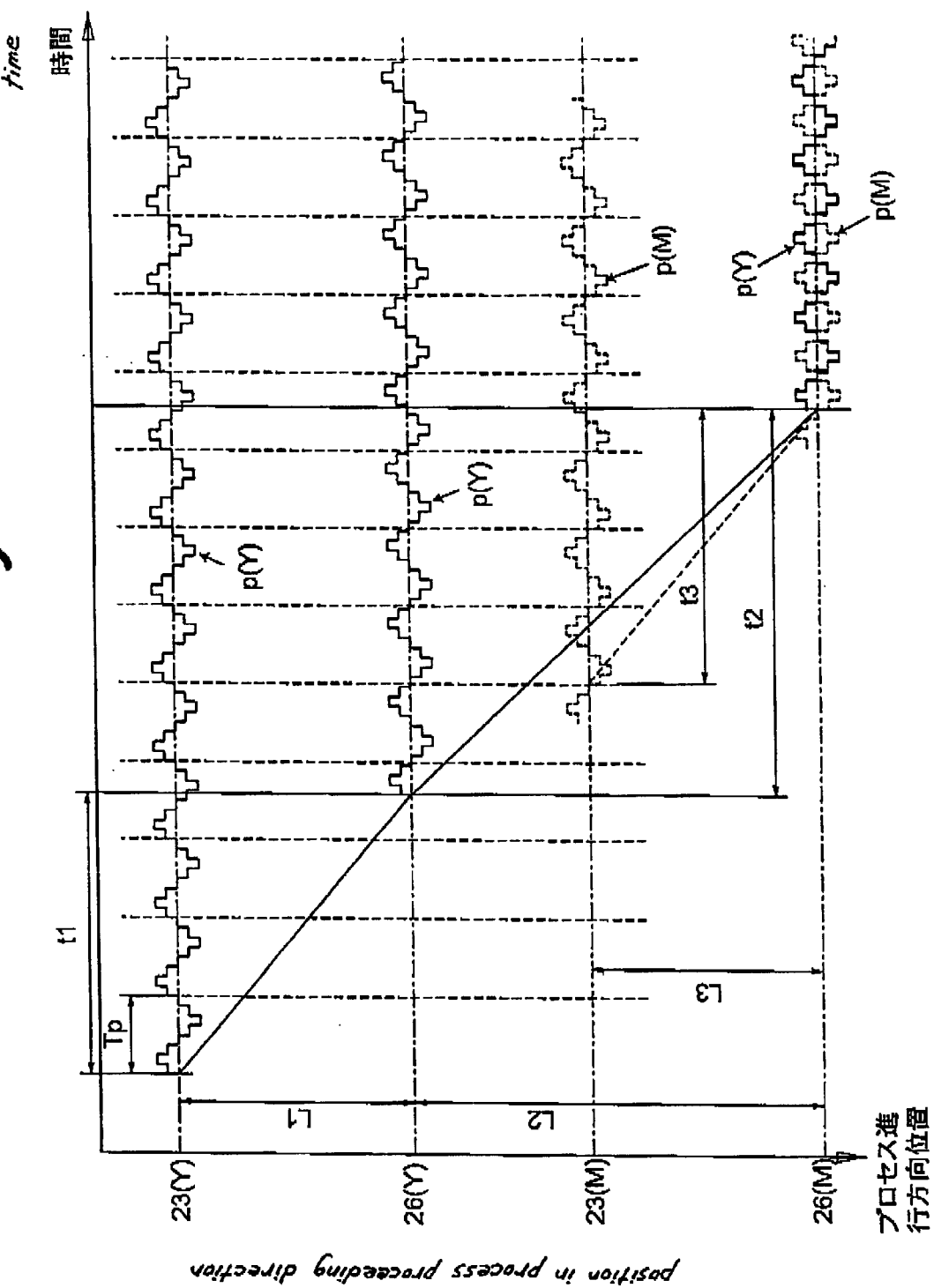
Figure 9A:
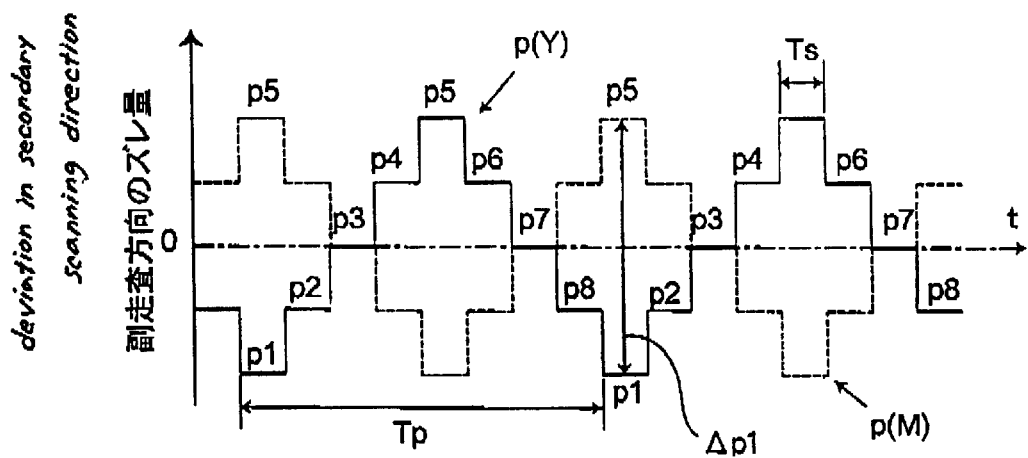
FIGS. 9A and 9B are diagrams for explaining the operation of the color image forming apparatus according to the second embodiment.

If such a problem has arisen, the Y mage p(Y) and the M image p(M) become greatly separated from each other, as shown in FIGS. 8 and 9A, because the scanning surfaces P1 and P5 of the rotary polygon mirror are 180° out of phase from each other. In other words, the maximum amount of misregistration arises in Δp1.

Figure 9B:
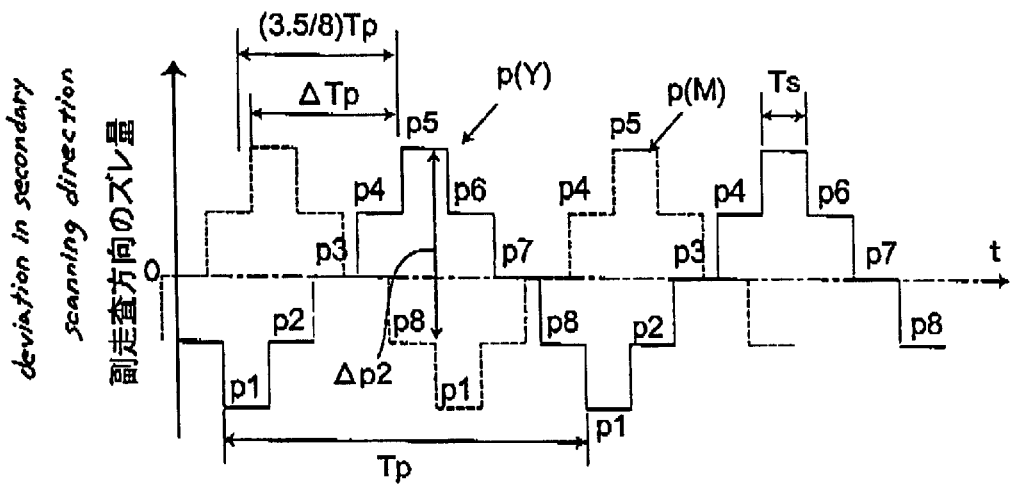

Both FIGS. 9A and 9B show that the Y image p(Y) and the M image p(M) overlap one another. The amount of misregistration arising in a secondary scanning direction (see FIG. 17B) is taken as a vertical axis, and time "t" is taken as a horizontal axis.

According to the embodiment, the plurality of image carriers are arranged such that the foregoing expression $|\Delta Tp|<(3.518)Tp$ is satisfied. For this reason, occurrence of a problem such as that described by reference to FIGS. 14C, 14D, and 9A is prevented.

Rather, as shown in FIG. 9B, there can be prevented occurrence of an overlap between an image (e.g., p1) formed on the upstream image carrier 21(Y) by a certain surface (e.g., the surface P1) of the rotary polygon mirror 51 and an image (e.g., p5) formed on the downstream image carrier 21(M) by an opposing surface (e.g., a surface P5 when the rotary polygon mirror has eight surfaces) opposite the surface (e.g., the surface P1) of the rotary polygon mirror.

In the worst case, an image (p4) formed on the downstream image carrier 21 (M) by a surface P4 (when ΔTp assumes a negative value as shown in FIG. 9B) or an image (p6) formed on the same by a surface P6 (although not shown, such an image arises when ΔTp assumes a positive value) is superimposed on the image (e.g., p1) formed by the certain surface of the rotary polygon mirror 51. Hence, the amount of misregistration between the images assumes a maximum of $\Delta p2=(3/4) \Delta p1$.

Consequently, a misregistration developing between images for reasons of an inclination of the rotation center O of the rotary polygon mirror 51 does not become maximum Δp1. Therefore, a misregistration between images is diminished.

Figure 10A:
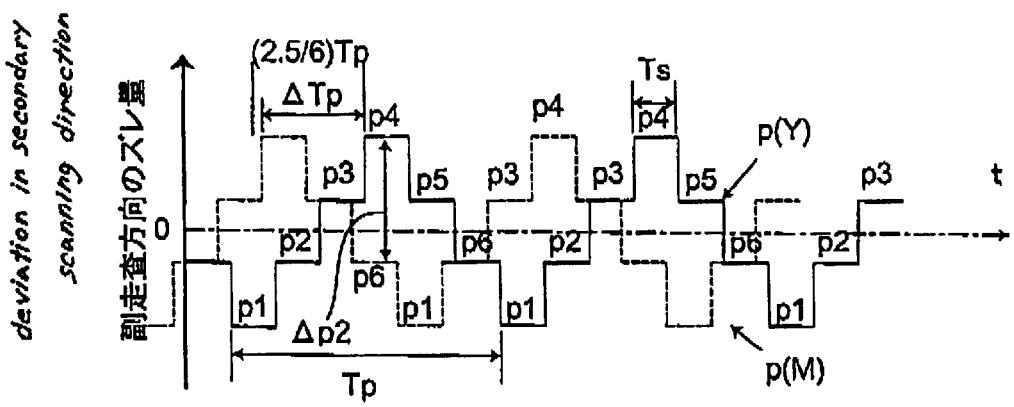
FIG. 10A is a diagram for describing the operation of the color image forming apparatus of the second embodiment.

When the number of scanning surfaces of the rotary polygon mirror 51 is six (Np=6), the foregoing expression assumes $|\Delta Tp|<(2.5/6)Tp$. As shown in FIG. 10A, at least an image formed by the opposing surface P4 opposite the surface P1 of the rotary polygon mirror 51 is prevented from being superimposed on the image (e.g., p1) formed by a certain surface (e.g., the surface P1) of the rotary polygon mirror 51. In the worst case, an image (p3) formed on the downstream image carrier. 21(M) by a surface P3 (when ΔTp assumes a negative value as shown in FIG. 10A) or an image (p5) formed on the same by a surface P5 (although not shown, such an image arises when ΔTp assumes a positive value) is superimposed on the image (e.g., p1) formed by the certain surface of the rotary polygon mirror 51. Hence, the amount of misregistration between the images assumes a maximum of $\Delta p2=(2/3) \Delta p1$ (Δp1 is omitted from the drawing).

Consequently, a misregistration developing between images for reasons of an inclination of the rotation center O of the rotary polygon mirror 51 does not become maximum (Δp1). Therefore, a misregistration between images is diminished.

Next, a third embodiment will be described. This embodiment differs from the first embodiment in the following point. Specifically, the plurality of image carriers are arranged so as to satisfy the following expression:

$$|t1+t2-t3-nTp| < [(Np/2)-1]Tp/Np$$

Here, Np is the number of surfaces of the rotary polygon mirror 51, which is an odd number not less than 3;

Here, Np is the number of surfaces of the rotary polygon mirror 51 (where Np=8);

Ts (see FIG. 3A) is the period of scanning performed by each of scanning surfaces P1 through P8 of the rotary polygon mirror 51;

Tp is the period of one rotation of the rotary polygon mirror 51 (where Tp=8Ts);

t1 is a time required for an image formed on the upstream image carrier 21(Y) among the plurality of image carriers (the image carriers 21(Y), 21(M) are described as typical image carriers).to be transferred from the image formation position 23(Y) to the transfer position 26(Y), where the image is transferred to the intermediate transfer belt 13;

t2 is a time required for the image to travel from the upstream transfer position 26(Y) to a downstream transfer position 26(M) defined between the downstream image carrier 21(M) and the intermediate transfer belt 13;

t3 is a time required for the image formed on the downstream image carrier 21(M) among the image carriers 21(Y), 21(M) to travel from the image formation position 23(M) to the transfer position 26(M); and n is a natural number.

Figure 10B:
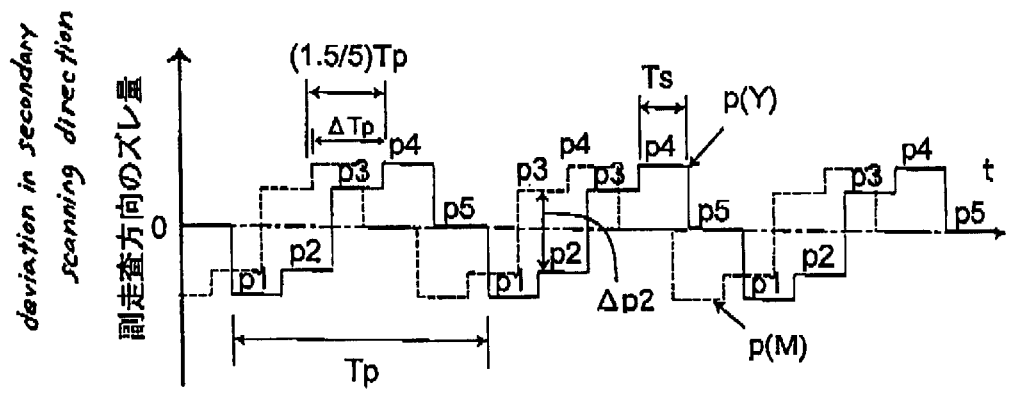
FIG. 10B is a diagram for describing the operation of the color image forming apparatus according to a third embodiment of the invention.

As in the case of the present embodiment, if the scanning surfaces Np of the rotary polygon mirror 51 assumes an odd number; for example, five, the foregoing expression assumes |ΔTp|<(1.5/5)Tp. Hence, as shown in FIG. 10B, at least an image formed by the opposing surface P4 or P5 opposite the surface P2 of the rotary polygon mirror 51 is prevented from being superimposed on the image (e.g., p2) formed by a certain surface (e g., the surface P2) of the rotary polygon mirror 51. In the worst case, an image (p3) formed on the downstream image carrier 21(M) by a surface P3 is superimposed on the image (e.g., p2) formed by the certain surface of the rotary polygon mirror 51. Hence, the amount of misregistration between the images assumes a maximum of Δp2<Δp1 (Δp1 is omitted from the drawing).

Consequently, a misregistration developing between images for reasons of an inclination of the rotation center O of the rotary polygon mirror 51 does not become maximum Δp1. Therefore, a misregistration between images is diminished.

Figure 11:
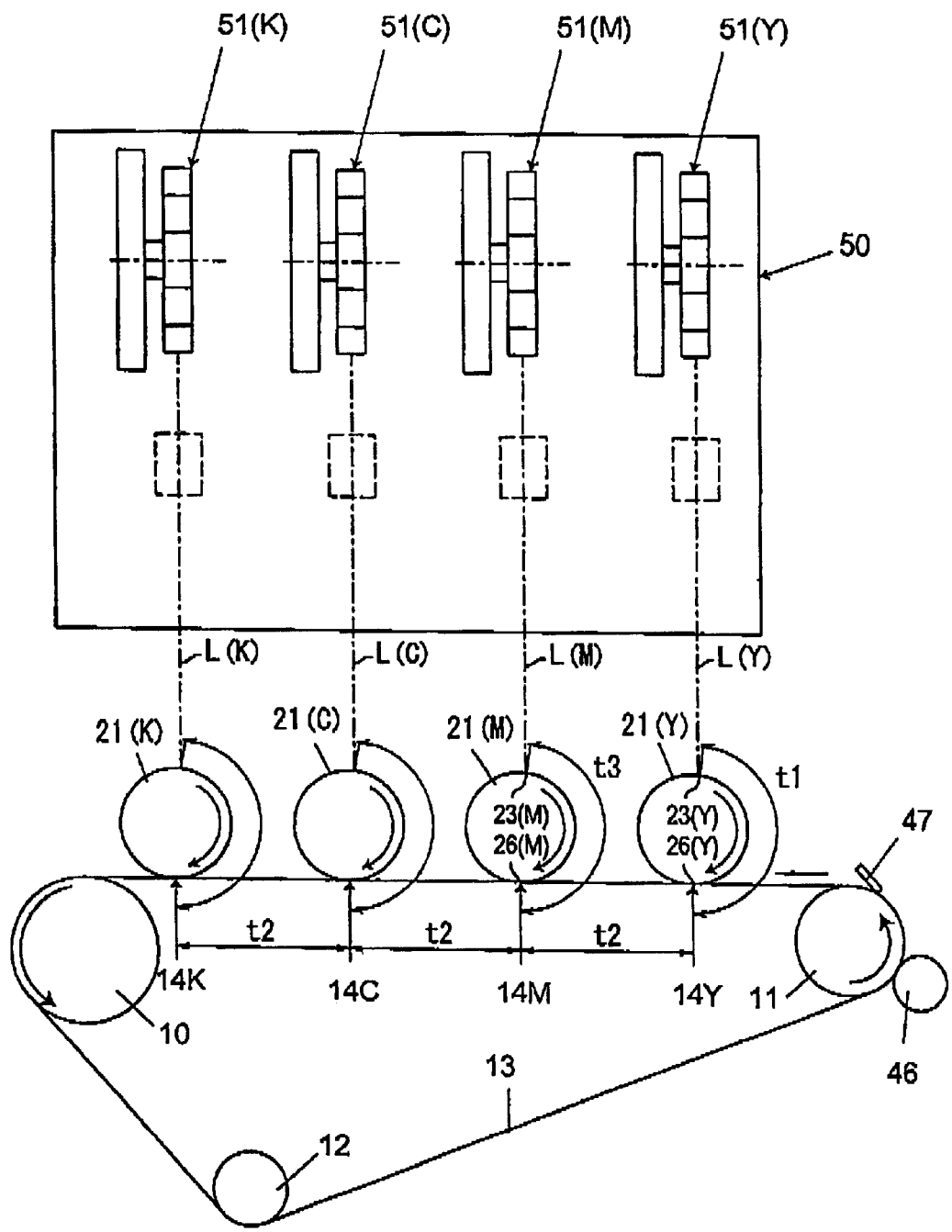
FIG. 11 is a schematic front view showing a color image forming apparatus according to a fourth embodiment of the invention.

FIG. 11 is a schematic front view showing a featured section of a color image forming apparatus according to a fourth embodiment of the invention. In the drawing, those elements which are identical with or correspond to those described in connection with the above embodiments are assigned the same numerals, The embodiment differs from the above embodiments in that the exposer 50 is constituted as a multiple rotary polygon mirror type in which a rotary polygon mirror 51(Y) is provided for the image carrier 21(Y), a rotary polygon mirror 51(M) is provided for the image-carrying mirror 21(M), a rotary polygon mirror 51(C) is provided for the image-carrying mirror 21(C), and a rotary polygon mirror 51(K) is provided for the image-carrying mirror 21(K). In other respects, the embodiment is essentially identical with the above embodiments.

Figure 12:
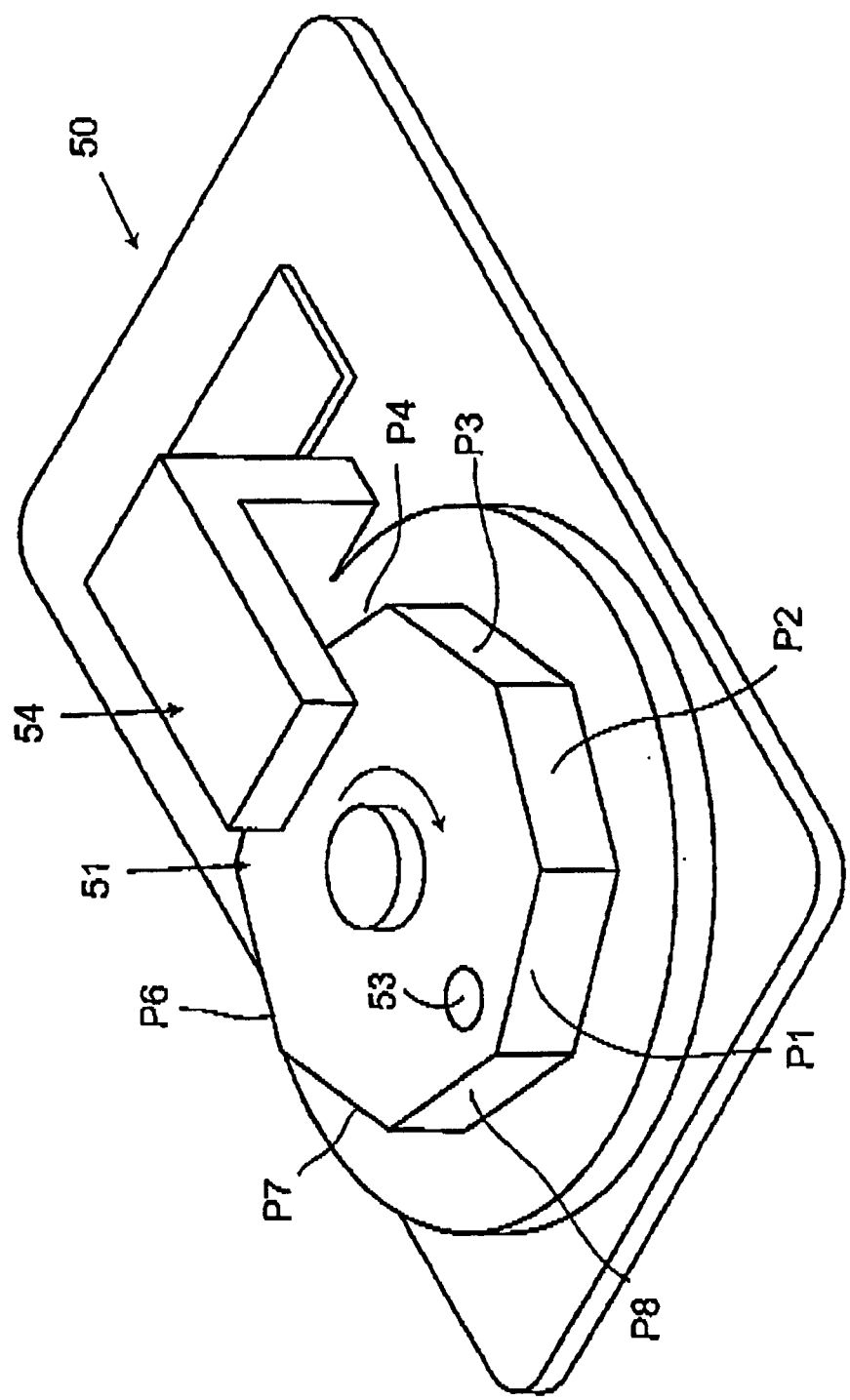
FIG. 12 is a perspective view showing a rotary polygon mirror in the color image forming apparatus of FIG. 11.

As shown in FIG. 12, holes 53 serving as sections to be detected are formed in the respective rotary polygon mirrors 51 for uniquely detecting the rotational phases of the scanning surfaces P1 through P8. For example, the rotational phases of the scanning surfaces P1 through P8 of the respective rotary polygon mirrors 51 are detected such that overlap arises between an image formed by a scanning surface P1 of an upstream rotary polygon mirror 51(Y) and an image formed by a scanning surface P1 of a downstream rotary polygon mirror 51(M). Each exposer 50 has a photosensor 54 serving as a detector for detecting the hole 53. Consequently, the rotational phases of the scanning surfaces P1 through P8 can be detected uniquely by use of a detection signal output from the photosensor 54.

Figure 13:
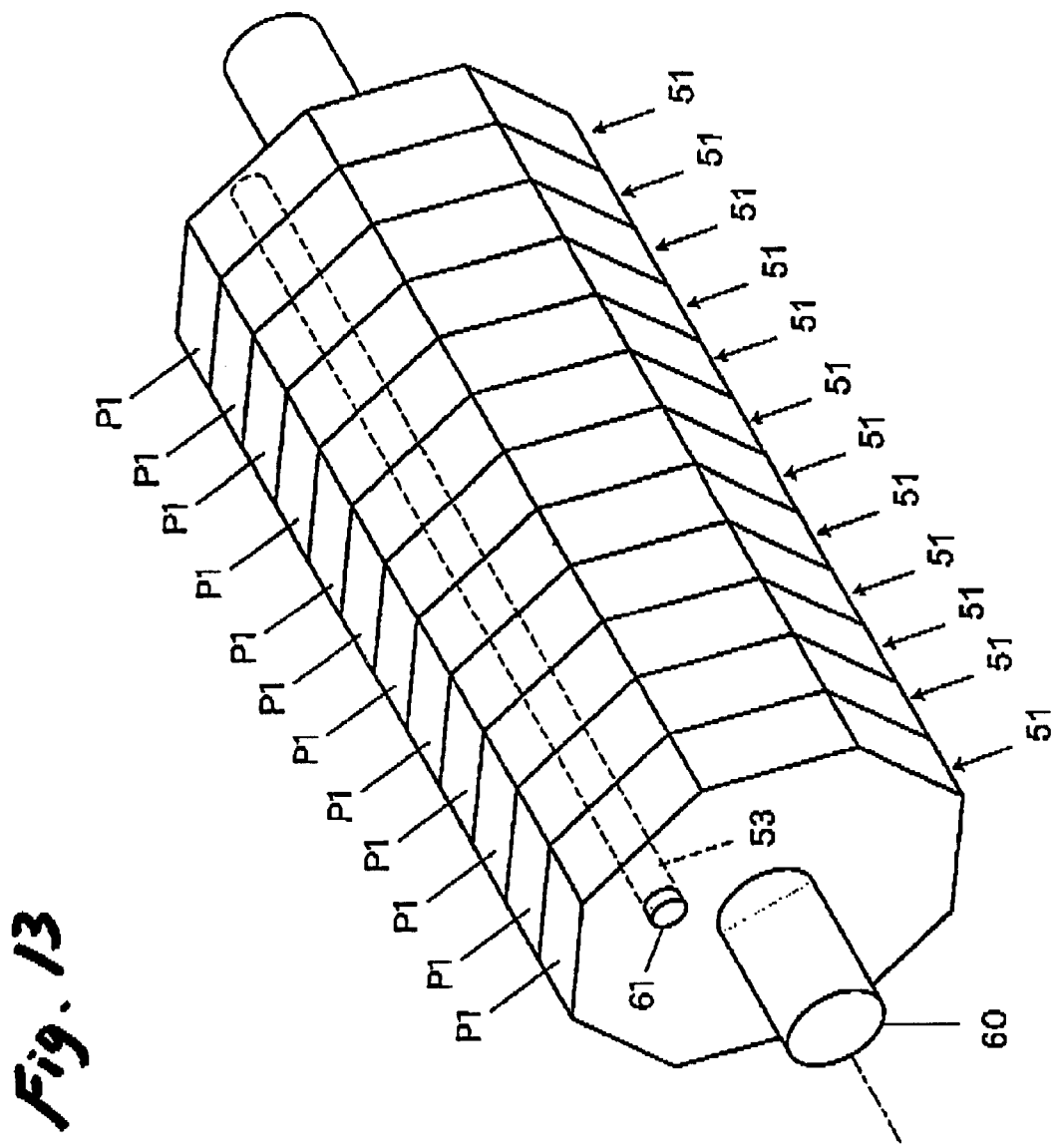
FIG. 13 is a perspective view showing processes for manufacturing the rotary polygon mirror of FIG. 12.

As shown in FIG. 13; each of the rotary polygon mirrors 51 is manufactured by polishing the scanning surfaces P1 through P8 while a plurality of rotary polygon mirrors 51. Here, an integral multiple of the number of image carriers 21 are supported by a common shaft 60 and while a positioning shaft 61 is inserted into the holes 53. In this example, there are provided 12 polygon mirrors which are triple of four image carriers.

The thus-manufactured rotary polygon mirrors 51 of the same lot are used as the rotary polygon mirrors 51 for the image carriers 21(Y), 21(M), 21(C), and 21(K) (see FIG. 12).

By such a construction, the scanning surfaces P1 through P8 of the respective rotary polygon mirrors 51 provided for the respective image carriers 21(Y), 21(M), 21(C), 21(K) become substantially identical with each other in terms of inclination or warpage. Essentially, there is achieved the same advantage as that yielded when only a single rotary polygon mirror is provided. Namely, there is achieved the same advantage as that yielded in the above embodiments.

Figure 14:
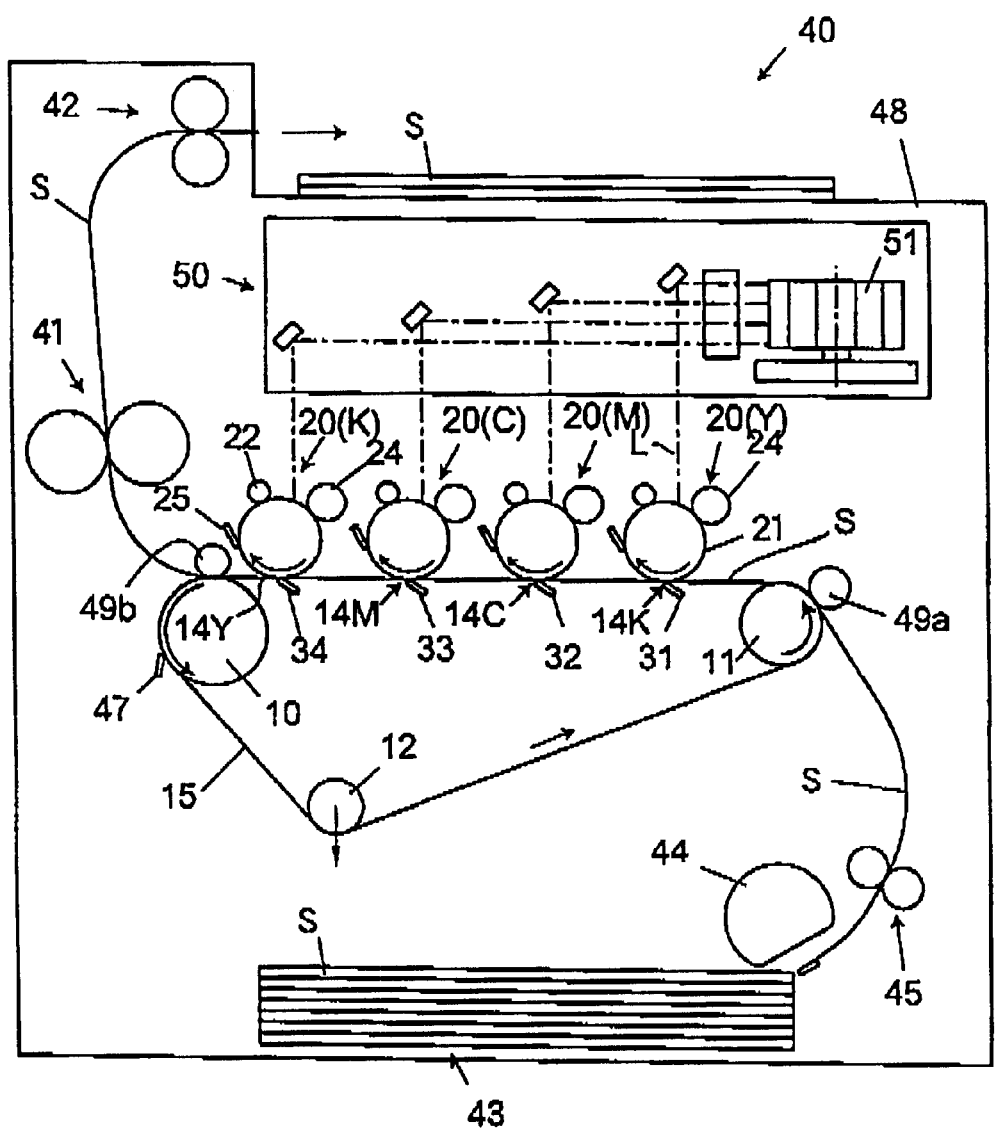
FIG. 14 is a schematic front view showing a color image forming apparatus according to a fifth embodiment of the invention.
Figure 15:
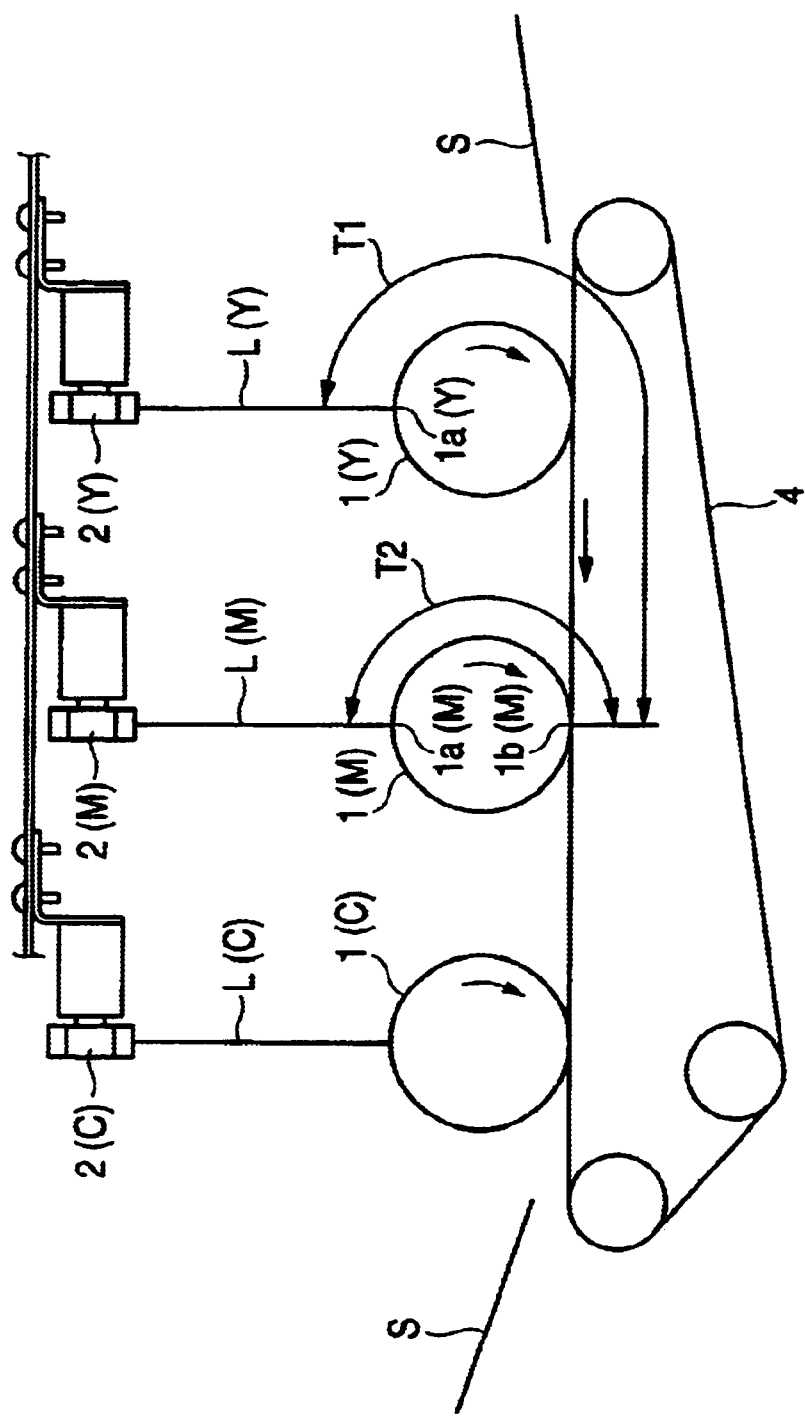
FIG. 15 is a descriptive view of the related-art color image forming apparatus.

FIG. 14 is a schematic front view showing a color image forming apparatus according to a fifth embodiment of the invention. In the drawing, those elements which are identical with or correspond to those described in the above embodiments are assigned the same reference numerals.

The embodiment differs from the above embodiments in that the intermediate transfer belt 13 is replaced with a transporting belt 15 for retaining and transporting a recording medium S. Toner images formed by the plurality of monochrome toner images former 20(Y), 20(M), 20(C), 20(K) are sequentially transferred to a recording medium S (an example object of transfer) retained by the transporting belt 15. In other respects, the color image forming apparatus of the embodiment is identical with those described in connection with the above embodiments.

In the drawing, an adhering roller 49a causes the transporting belt 15 to retain the recording medium S from the pair of gate rollers 45. A peeling roller 49b peels the recording medium S from the transporting belt 15 and supplies the thus-peeled recording medium S to the pair of fixing rollers 41.

Even such an embodiment yields the same advantage as those yielded in the first embodiment.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A color image forming apparatus, comprising:

a transporting path, through which a recording medium is transported;

a plurality of rotary image carriers, arranged in the transporting path; wherein at least one rotary polygon mirror, which rotates to reflect light so as to scan an outer peripheral surface of each of the image carriers in a first direction when each of the image carriers is rotated in a second direction perpendicular to the first direction, so that a monochrome latent image is formed on the outer peripheral surface of each of the image carriers to be developed and superimposedly transferred onto a transferred object to form a color image thereon, wherein the image carriers are arranged so as to satisfy the following expression:

$$-Ts/2 < t1+t2-t3-nTp < Ts/2$$

where Ts is a time period of scanning performed by each of reflecting surfaces of the polygon mirror;

Tp is a time period of one rotation of the polygon mirror;

t1 is a time period required for a first latent image formed on a first image carrier among the image carriers is developed and transferred to the transferred object at a first transferring position;

t2 is a time period required for the first image is traveled from the first transferring position to a second transferring position at a downstream of the transporting path;

t3 is a time period required for a second latent image formed on a second image carrier adjacent to the first image carrier is developed and transferred to the transferred object at the second transferring position; and n is a natural number.

2. A color image forming apparatus, comprising;

a transporting path, through which a recording medium is transported;

a plurality of rotary image carriers, arranged in the transporting path; wherein at least one rotary polygon mirror, which rotates to reflect light so as to scan an outer peripheral surface of each of the image carriers in a first direction when each of the image carriers is rotated in a second direction perpendicular to the first direction, so that a monochrome latent image is formed on the outer peripheral surface of each of the image carriers to be developed and superimposedly transferred onto a transferred object to form a color image thereon, wherein the image carriers are arranged so as to satisfy the following expression;

$$|t1+t2-t3-nTp| < [(Np/2)-0.5]Tp/Np$$

where Np is the number of reflecting surfaces of the polygon mirror which is an even number not less than 4;

Ts is a time period of scanning performed by each of the reflecting surfaces of the polygon mirror;

Tp is a time period of one rotation of the polygon mirror;

t1 is a time period required for a first latent image formed on a first image carrier among the image carriers is developed and transferred to the transferred object at a first transferring position;

t2 is a time period required for the first image is traveled from the first transferring position to a second transferring position at a downstream of the transporting path;

t3 is a time period required for a second latent image formed on a second image carrier adjacent to the first image carrier is developed and transferred to the transferred object at the second transferring position; and n is a natural number.

3. A color image forming apparatus, comprising:

a transporting path, through which a recording medium is transported;

a plurality of rotary image carriers, arranged in the transporting path; wherein at least one rotary polygon mirror, which rotates to reflect light so as to scan an outer peripheral surface of each of the image carriers in a first direction when each of the image carriers is rotated in a second direction perpendicular to the first direction, so that a monochrome latent image is formed on the outer peripheral surface of each of the image carriers to be developed and superimposedly transferred onto a transferred object to form a color image thereon, wherein the image carriers are arranged so as to satisfy the following expression;

$$|t1+t2-t3-nTp| < [(Np/2)-1]Tp/Np$$

where Np is the number of reflecting surfaces of the polygon mirror which is an odd number not less than 3;

Ts is a time period of scanning performed by each of the reflecting surfaces of the polygon mirror;

Tp is a time period of one rotation of the polygon mirror;

t1 is a time period required for a first latent image formed on a first image carrier among the image carriers is developed and transferred to the transferred object at a first transferring position;

t2 is a time period required for the first image is traveled from the first transferring position to a second transferring position at a downstream of the transporting path;

t3 is a time period required for a second latent image formed on a second image carrier adjacent to the first image carrier is developed and transferred to the transferred object at the second transferring position; and n is a natural number.

4. The color image forming apparatus as set forth in any one of claims 1 to 3, wherein a plurality of polygon mirrors are provided so as to be associated with the image carriers in a one-by-one manner.

5. The color image forming apparatus as set forth in any one of claims 1 to 3, wherein the transferred object is an intermediate transfer belt which temporarily retains the color image to be transferred to the recording medium.

6. The color image forming apparatus as set forth in any one of claims 1 to 3, wherein the transferred object is the recording medium.

* * * * *